United States Patent
Rzany et al.

(10) Patent No.: US 9,368,284 B2
(45) Date of Patent: Jun. 14, 2016

(54) ANODE ELECTRODE FOR ALUMINUM ELECTROLYTIC CAPACITOR AND RESPECTIVE PRODUCTION METHOD

(71) Applicant: LITRONIK Entwicklungs GmbH, Husum (DE)

(72) Inventors: Alexander Rzany, Nuremberg (DE); Bernhard Hensel, Erlangen (DE); Nicolas Bartilla, Heiligenstadt (DE); Bernd Pretzlaff, Mildstedt (DE)

(73) Assignee: LITRONIK ENTWICKLUNGS GMBH, Husum (DE)

( * ) Notice: Subject to any disclaimer, the term of this patent is extended or adjusted under 35 U.S.C. 154(b) by 158 days.

(21) Appl. No.: 14/341,714

(22) Filed: Jul. 25, 2014

(65) Prior Publication Data

US 2015/0062782 A1     Mar. 5, 2015

Related U.S. Application Data

(60) Provisional application No. 61/872,776, filed on Sep. 2, 2013.

(51) Int. Cl.
*H01G 9/045*     (2006.01)
*H01G 9/00*     (2006.01)

(52) U.S. Cl.
CPC .............. *H01G 9/0029* (2013.01); *H01G 9/045* (2013.01); *H01G 2009/0025* (2013.01); *Y10T 29/417* (2015.01)

(58) Field of Classification Search
None
See application file for complete search history.

(56) References Cited

U.S. PATENT DOCUMENTS 7,615,703 B2 * 11/2009 Hirose ................. H01G 9/2009
136/243

FOREIGN PATENT DOCUMENTS

WO     2010/106072     9/2010

* cited by examiner

*Primary Examiner* — Scott B Geyer
(74) *Attorney, Agent, or Firm* — ARC IP Law, PC; Joseph J. Mayo

(57) ABSTRACT

An aluminum electrolytic capacitor including an anode electrode, and a method for producing the anode electrode. The method includes providing an aluminum electrolyte including an ionic liquid and an aluminum salt, galvanically depositing an aluminum on an aluminum foil formed from the aluminum electrolyte, and anodically oxidizing a surface of the aluminum foil. The ionic liquid includes a pyrrolidinium cation and a halogenide. The aluminum electrolyte includes 50-70 mol. % of the aluminum salt based on a total substance amount of the ionic liquid and the aluminum salt. The galvanic deposition includes and is based on a deposition temperature ranging from 20° C. to 100° C., a current density ranging from 1 to 100 mA/cm$^2$, an applied potential ranging from −0.1 V to −1.0 V based on a potential of an aluminum reference electrode, and a deposition rate ranging from 1 to 50 μm/h.

9 Claims, 5 Drawing Sheets

10μm

10μm

10μm

20μm

10μm

10μm

ANODE ELECTRODE FOR ALUMINUM ELECTROLYTIC CAPACITOR AND RESPECTIVE PRODUCTION METHOD

This application claims the benefit of U.S. Provisional Patent Application 61/872,776 filed on 2 Sep. 2013, the specification of which is hereby incorporated herein by reference.

BACKGROUND OF THE INVENTION

1. Field of the Invention

At least one embodiment of the invention relates to a method for producing an anode electrode for an aluminum electrolytic capacitor, an anode electrode obtainable by the method, and also an aluminum electrolytic capacitor containing such an anode electrode.

2. Description of the Related Art

An aluminum electrolytic capacitor is a capacitor of which the anode electrode (also referred to as the anode foil) consists of aluminum, on which a uniform, electrically insulating aluminum oxide layer in the form of a dielectric is produced by anodic oxidation. Generally, a liquid or solid electrolyte forms the cathode of the capacitor. Typically, anhydrous electrolytes are used almost exclusively, of which the conductivity is much lower than water, such that an internal resistance of the capacitor increases. Conventional aluminum electrolytic capacitors therefore generally, include a second aluminum foil as a current feed to the electrolyte, wherein the aluminum foil is typically electrically separated from the anode electrode by a separator permeable to the electrolyte. Generally, the second aluminum foil is also referred to as (actually incorrectly) as a cathode foil.

The anode electrode consists of a foil made of highly pure aluminum. Generally, the foil is roughened in an electrochemical process in order to increase the effective anode surface. Due to this roughening process, the effective surface may be increased up to approximately 150 times compared to a smooth surface.

After the roughening process, the aluminum foil is anodically oxidized. Thus, an electrically insulating oxide layer ($Al_2O_3$) is formed on the aluminum surface by applying a current source in correct polarity in an electrolytic bath, wherein the insulating oxide layer constitutes the dielectric of the capacitor.

The roughened and anodically oxidized anode foil and the roughened cathode foil are cut to a desired width during a further course of the manufacturing process, generally from a parent roll, and are then cut to length. The foils are then connected to aluminum strips placed transversely relative to the foils in order to contact terminals of the capacitor. Together with two paper strips as a separator and as a reservoir for the electrolyte, the foils are then usually wound into a coil. The coil of the capacitor with the terminals led out is then saturated under vacuum with the electrolyte in a subsequent production step. This fully matches the structure of the anode foil and of the dielectric located thereon and thus makes the surface enlargement of the anode capacitively effective for the first time. The saturated, or impregnated coil is installed in an aluminum casing, provided with a sealing plate, and is fixedly mechanically closed by flanging. The capacitor is then freed from defective points in the dielectric (healed up) by reforming.

Aluminum electrolytic capacitors correspond to plate capacitors, of which the capacitance, inter alia, is greater, the greater is the electrode surface. The total capacitance of the aluminum electrolytic capacitor is determined definitively by the magnitude of the anode capacitance, since the capacitance of the cathode foil is generally much smaller. High capacitances and power densities may therefore be achieved by enlarging the effective surface of the anode foil.

As described above, the enlargement of the effective surface is achieved in commercial products by etching a porous surface structure. Here, a compact aluminum foil of constant thickness is used as a starting point, and the structure is formed subsequently. Surface factors of up to 150 are achieved. However, a further increase of the effective surface, even by optimization of the etching processes, is typically no longer possible. Heavier etching generally leads to a loss of mechanical integrity of the material. The use of a thicker starting material also does not lead to an enlargement of the effective surface, since areas close to the surface are typically lost as a result of the etching process.

There is thus a considerable need to further increase the capacitance of aluminum electrolytic capacitors. In particular, it would be desirable if the effective surface of the anode electric could be increased further.

BRIEF SUMMARY OF THE INVENTION

One or more embodiments of the invention include a method for producing an anode electrode for an aluminum electrolytic capacitor.

At least one embodiment of the invention includes providing an aluminum electrolyte that includes or consists essentially of or consists of an ionic liquid, which is formed at least by, or may include, at least one pyrrolidinium cation and at least one halogenide anion or for example mainly contains these, and an aluminum salt, or contains these two components and other ingredients for example. In at least one embodiment, the aluminum electrolyte may include 50-70 mol. % of aluminum salt based on a total substance amount of the ionic liquid and the aluminum salt. In one or more embodiments, the electrolyte may optionally contain an organic solvent, such as toluene, in order to influence the deposition properties.

At least one embodiment of the invention includes galvanic deposition of aluminum on an aluminum foil formed from the aluminum electrolyte. In one or more embodiments, the galvanic deposition is performed according to the following parameters:

- a deposition temperature in a range of 30° C. to 100° C., for example such as a range of 20° C. to 60° C.;
- a current density in a range of 1 to 100 $mA/cm^2$;
- an applied potential in a range of −0.1 V to −1.0 V,—for example such as a range of 0.2 V to −0.6 V, based on a potential of an aluminum reference electrode; and
- a deposition rate in a range of 1-50 μm/h.

At least one embodiment of the invention may include oxidizing a surface of the aluminum foil obtained by galvanic deposition, as described above.

One or more embodiments of the invention enable further increasing the effective surface of the aluminum anode foil, compared to the typical etching processes, using the novel coating process described herein. In at least one embodiment, aluminum from a specific substance class of ionic liquids may be galvanically deposited on the aluminum foil such that structures form which lead to a significant increase of the effective surface. These structures, in one or more embodiments, may include aluminum and may for example be granular dendritic, pillar-shaped or honeycomb-shaped, wherein the granular dendritic or pillar-shaped structures and may for example be microcrystalline. By way of at least one embodiment, the effective surface compared to a smooth surface may be enlarged by at least 200 times and more. One or more embodiments of the invention enable the production of aluminum anode foils having a surface factor that is higher compared to etched anode foils. By varying the coating parameters of the galvanic deposition, in at least one embodiment, the deposited surface structures are influenced, and considerably finer surface structures may be generated compared to etched aluminum. As such, in one or more embodiments, a layer thickness grows compared to using a typical etching method.

In at least one embodiment, aluminum is therefore coated in the galvanic process with highly structured aluminum. The coating process, in one or more embodiments, is carried out under well-defined one or more conditions or process parameters of ionic liquids, formed by or including at least one pyrrolidinium cation and at least one halogenide anion. In at least one embodiment, the ionic liquids may be anhydrous, and may enable the deposition of highly pure metal aluminum structures. According to at least one embodiment, by adjusting the process parameters, such as the type of ionic liquid, concentration of aluminum, temperature and current waveform, the structure of the deposited aluminum may be produced selectively in a wide range of conditions from dendritic to smooth. In one or more embodiments, the structure may be influenced by an addition of an organic solvent, such as toluene. In at least one embodiment, the parameters may be predefined parameters, such that an effective surface is enlarged by a factor of 200 or more, compared to a smooth surface.

By way of at least one embodiment of the invention, production of anode electrodes for aluminum electrolytic capacitors using the described galvanic deposition process enables one or more of the following advantages:
  the effective surface is enlarged, and exceeds that of porously etched anode electrodes, resulting in a higher power density;
  the higher power density produced enables a size reduction of the capacitors, thus reducing a required volume of the capacitor used in implantable medical devices, such as defibrillators;
  a thicknesses of the galvanically deposited (highly porous to dendritic) aluminum are increased, higher than with etched aluminum anode foils;
  the thickness of the aluminum anode foils is increased and enables a reduction of the number of layers used in an aluminum electrolytic capacitor, resulting in a simpler production process; and,
  the properties of the aluminum anode foil produced may be adjusted in a wide range by varying the deposition parameters, and wherein a plurality of structures may be combined within one aluminum anode foil.

According to one or more embodiments, ionic liquids may include organic salts, wherein the ions hinder the formation of a stable crystal lattice as a result of charge delocalization and sterile effects. In at least one embodiment, low thermal energy is therefore sufficient to overcome the lattice energy and to break open the solid crystal structure. This generally concerns salts that are liquid at temperatures below 100° C., without the salt being dissolved in a solvent. In at least one embodiment of the invention, the cations, which may be alkylated, include one or more of imidazolium, pyridinium, pyrrolidinium, guanidinium, uronium, thiouronium, piperidinium, morpholinium, ammonium and phosphonium. In one or more embodiments, the anions may include halogenides and more complex ions, such as tetrafluoroborates, trifluoracetates, triflates, hexafluorophosphates, phosphinates and tosylates. In at least one embodiment, the anions may include organic ions, such as imides and amides. By varying the substituents of a given cation and by varying the anion, according to at least one embodiment, physical-chemical properties of the ionic liquid may be varied in wide limits and may be optimized based on technical requirements. In one or more embodiments, a melting point and a solubility of aluminum chloride in the ionic liquid may be influenced.

In at least one embodiment, a series of ionic liquids for the galvanic deposition of aluminum are listed for example in WO 2010/106072 A2. In one or more embodiments, the widespread ionic liquids for the deposition of granular or smooth aluminum layers may include, for example, 1-ethyl-3-methylimidazolium-chloride ([EMOM][Cl]) and 1-butyl-2,3-dimethylimidazolium-chloride ([BMMIM][Cl]). In at least one embodiment, ionic liquids that are formed at least by a pyrrolidinium cation and at least by a halogenide anion or contain these are utilized for the deposition according to at least one the invention of defined aluminum structures on aluminium, with a large effective surface. An example for this substance class is 1-butyl-1-methylpyrrolidinium-chloride ([BMPyrr][Cl]). In at least one embodiment, the deposition properties may be influenced by the addition of an organic solvent, such as toluene.

According to at least one embodiment, the aluminum electrolyte may include the ionic liquid that is formed by, or includes, a pyrrolidinium cation and a halogenide anion, and may also include the aluminum salt, and the organic solvent. In one or more embodiments, a substance amount fraction of the aluminum salt of the aluminum electrolyte may include 50-70 mol. % based on the total substance amount of the ionic liquid and the aluminum salt. In at least one embodiment, the aluminum salt may include one or more of aluminum fluoride, aluminum chloride, aluminum bromide and aluminum iodide.

By way of at least one embodiment of the invention, an anode electrode for an aluminum electrolytic capacitor is produced.

One or more embodiments of the invention include an aluminum electrolytic capacitor including an anode electrode.

BRIEF DESCRIPTION OF THE DRAWINGS

The above and other aspects, features and advantages of at least one embodiment of the invention will be more apparent from the following more particular description thereof, presented in conjunction with the following drawings wherein.

DETAILED DESCRIPTION OF THE INVENTION

The following description is of the best mode presently contemplated for carrying out at least one embodiment of the invention. This description is not to be taken in a limiting sense, but is made merely for the purpose of describing the general principles of the invention. The scope of the invention should be determined with reference to the claims.

Figure 8:
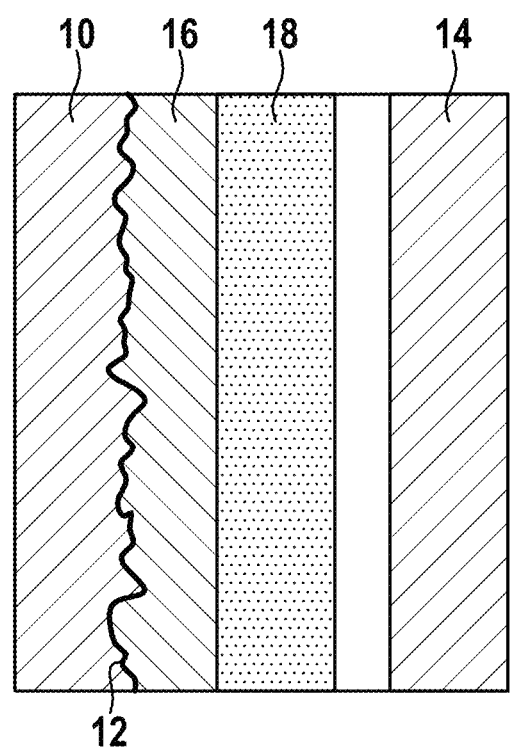
FIG. 8: shows a schematic sectional illustration through an aluminum electrolytic capacitor including an anode electrode, according to at least one embodiment of the invention.

FIG. 8 shows a schematic illustration of a sectional view through a sub-region of an aluminum electrolytic capacitor, which includes an anode electrode, according to at least one embodiment of the invention. As shown in FIG. 8, one or more embodiments may include an anode electrode formed from a first aluminum foil 10 and dielectric 12, and a second aluminum foil 14 (also referred to herein as a cathode foil). In at least one embodiment, the first aluminum foil 10 may be covered on both sides by the dielectric 12 formed from aluminum oxide. In one or more embodiments, the dielectric 12 may be produced by anodic oxidation of the surface of the first aluminum foil 10. By way of at least one embodiment, the surface may include a surface structure deposited galvanically (as will be described in greater detail hereinafter) that causes a considerable enlargement of the effective surface of the first aluminum foil 10 provided per unit of area. In one or more embodiments, the surface of the second aluminum foil 14 may be treated similarly to the first aluminum foil 10. In at least one embodiment, the surface of the second aluminum foil 14 may be roughened in the conventional manner by etching, for example. In one or more embodiments, an electrolyte 16 and a separator 18, permeable to the electrolyte 16, may be located between the two aluminum foils 10, 14.

Production of the Anode Electrode

According to at least one embodiment of the invention, aluminum structures, such as anode foils, lead to a significant enlargement of the effective surface, and may be galvanically deposited from ionic liquids. In at least one embodiment, the ionic liquid may be formed from, or include, at least one pyrrolidinium cation and at least one halogenide anion. In one or more embodiments, the ionic liquid may include 1-butyl-1-methylpyrrolidinium-chloride ([BMPyrr][Cl]). In at least one embodiment, aluminum may be dissolved in the form of aluminum chloride. According to at least one embodiment, the amount of dissolved aluminum chloride is a key parameter that influences the formation of the aluminum structures, and increases the effective surface in the event of galvanic deposition. In one or more embodiments, a corresponding deposition may only be possible from a substance amount fraction of 50% aluminum chloride or at least 50% of aluminum chloride. In at least one embodiment, the substance amount fraction of the aluminum chloride should not exceed 70%. In one or more embodiments, the fraction is based on, in each case, a total weight of the ionic liquid and the aluminum chloride.

In at least one embodiment of the invention, a parameter of the galvanic deposition process may include temperature, which influences reactivity and viscosity of the electrolyte. In one or more embodiments, the viscosity of the electrolyte may be reduced by the addition of an organic solvent to the aluminum electrolyte, for example toluene. In at least one embodiment, the temperature may be in a range of 20° C. to 100° C., such as a range of 20° C. to 60° C.

Figure 1:
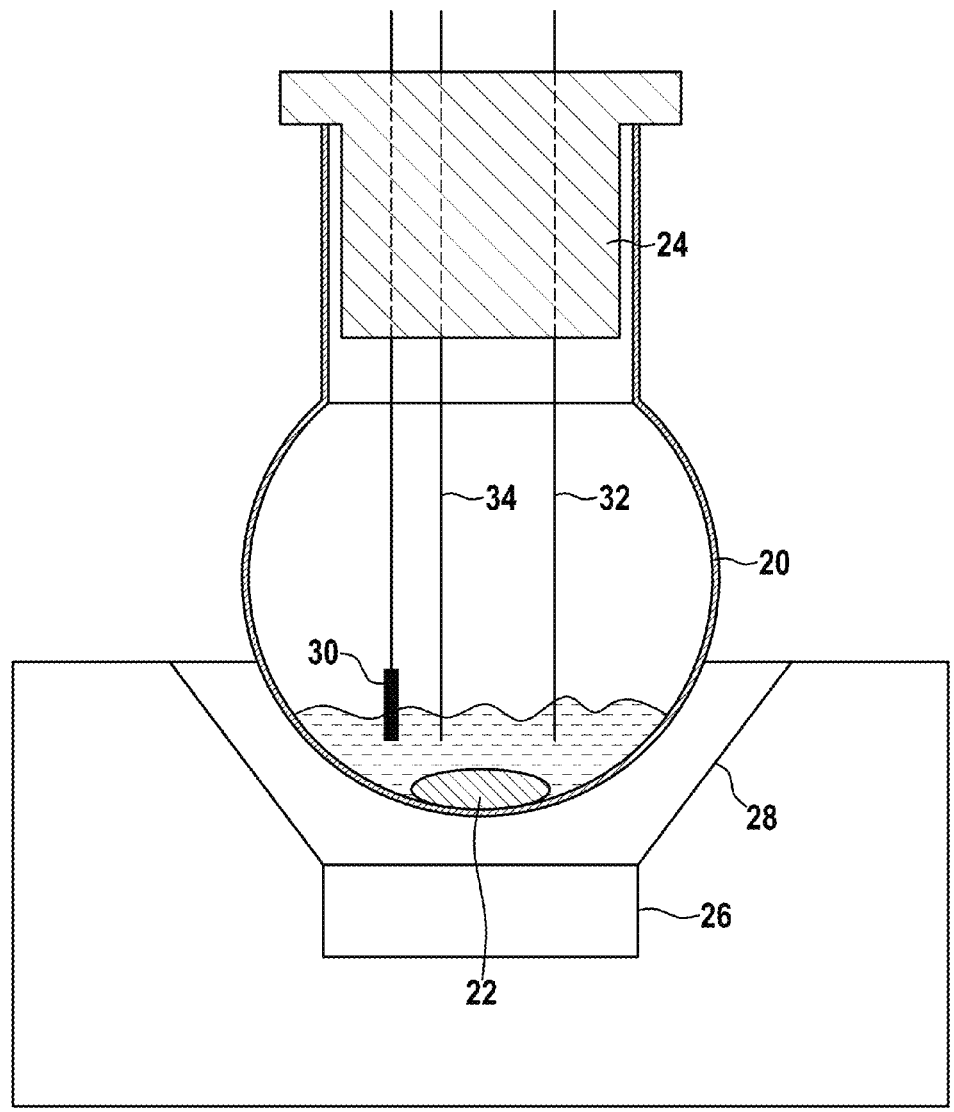
FIG. 1: shows a simplified test set-up for a method of producing an anode electrode of an aluminum electrolytic capacitor, according to at least one embodiment of the invention.

In one or more embodiments, the galvanic deposition may occur in a galvanic cell under potentiostatic or galvanostatic control. FIG. 1 shows a simplified electrochemical test set-up for a method of producing the anode electrode of the aluminum electrolytic capacitor, according to at least one embodiment of the invention. As shown in FIG. 1, in one or more embodiments, the ionic liquid with the dissolved aluminum chloride and optional organic solvent is located in a glass flask 20 closed by a stopper 24 and may be moved by a stirrer 26 using a magnetic stirring bar 22. In at least one embodiment, the temperature may be controlled by an external heater 28. In one or more embodiments, the substrate to be coated may be connected cathodically as a working electrode 30 to an external potentiostat (not illustrated). In at least one embodiment, a sheet metal or a wire formed from pure aluminium may be used as a counter electrode 32. During the deposition process, according to at least one embodiment, the aluminum material may be dissolved by anodic oxidation and may supply the deposited aluminum, wherein the electrolyte may not become depleted of aluminum. In one or more embodiments, the potentials are based on the potential of an aluminum reference electrode 34. By way of at least one embodiment, the entire set-up may be arranged in a protective atmosphere, for example with water content and oxygen content <1 ppm. In one or more embodiments, the set-up may be scaled with the size of the substrate to be coated. Once the electrodes 30, 32, 34 have been dipped into the temperature-controlled ionic liquid, according to at least one embodiment, the deposition of aluminum begins by application of external cathode potentials to the working electrode 30 under control of the external potentiostat.

In one or more embodiments, the charge that has flowed may be fully implemented in the cathodic deposition of aluminum at the working electrode 30. In at least one embodiment, the current density may be in a range of 1 to 100 mA/cm$^2$. In one or more embodiment, this leads to deposition rates in the range of 1 to 50 micrometer/hour.

In one or more embodiments, after the deposition process, the substrate coated with aluminum may be removed, cleaned using an organic solvent (acetonitrile, tetrahydrofuran), and dried.

In at least one embodiment, the production of highly structured surfaces on the aluminum anode foil may include varying one or more of the aluminum substance amount fraction in the ionic liquid, the substance amount fraction of an organic solvent, the temperature, the current density and the potential, during the deposition process. Depending on the combination of parameters, in one or more embodiments, highly different aluminum structures may be deposited, and may include, in combination, sequential deposition of the aluminum structures.

FIGS. 2 to 7 show images of surface structures produced on an aluminum anode foil, according to at least one embodiment of the invention. In one or more embodiments, the images may be recorded by an electron microscope.

(1) Granular Aluminum

Figure 2:
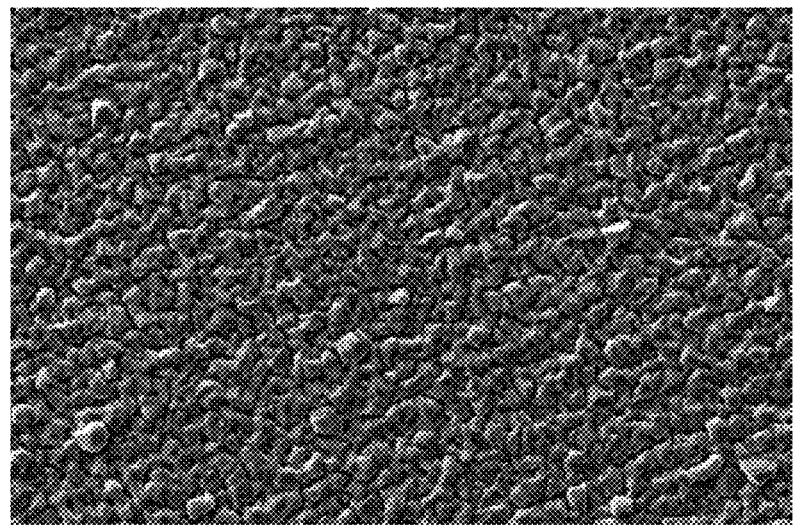
FIGS. 2 to 7: show images recorded by an electron microscope of surface structures produced on an aluminum anode foil, according to at least one embodiment of the invention.

In at least one embodiment, granular deposition of granular aluminum may be produced from the ionic liquid 1-butyl-1-methylpyrrolidinium-chloride ([BMPyrr][Cl]). In one or more embodiments, aluminum chloride is dissolved in a concentration of 65 mol. %, and a temperature of 50° C. is set. In one or more embodiments, deposition may be carried out at a potential of −0.5 V compared to the aluminum reference electrode. In at least one embodiment, after 45 minutes of deposition duration, the aluminum surface as shown in FIG. 2 is obtained (image recorded by electron microscope).

(2) Pillar-Shaped Aluminum

Figure 3:
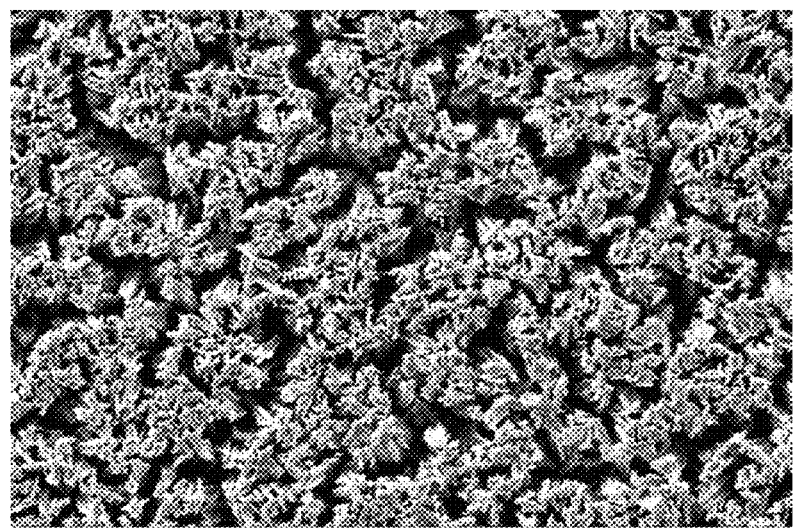

In at least one embodiment, galvanic deposition of pillar-shaped aluminum may be produced from the ionic liquid 1-butyl-1-methylpyrrolidinium-chloride ([BMPyrr][Cl]). In one or more embodiments, aluminum chloride is dissolved in a concentration of 60 mol. %, and a temperature of 60° C. is set. In at least one embodiment, deposition may be carried out at a potential of −0.5 V compared to the aluminum reference electrode. In one or more embodiments, after 60 minutes of deposition duration, the aluminum surface as shown in FIG. 3 is obtained (image recorded by electron microscope).

(3) Thread-Like Aluminum

Figure 4:
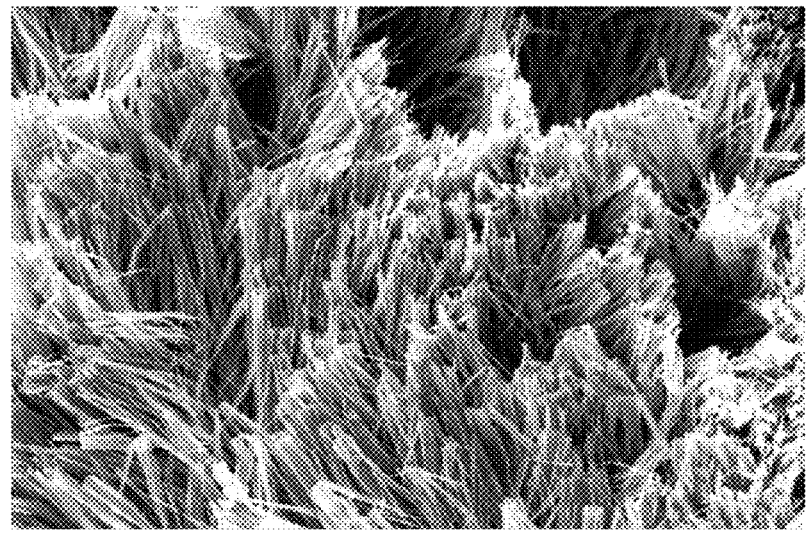

In at least one embodiment of the invention, galvanic deposition of thread-like aluminum may be produced from the ionic liquid 1-butyl-1-methylpyrrolidinium-chloride ([BMPyrr][Cl]). In one or more embodiments, aluminum chloride is dissolved in a concentration of 60 mol. %, and a temperature of 55° C. is set. By way of at least one embodiment, deposition may be carried out at a potential of −0.5 V compared to the aluminum reference electrode. In one or more embodiments, after 60 minutes of deposition duration, the aluminum surface as shown in FIG. 4 is obtained (image recorded by electron microscope).

(4) Honey-Comb Shapes Aluminum

Figure 5:
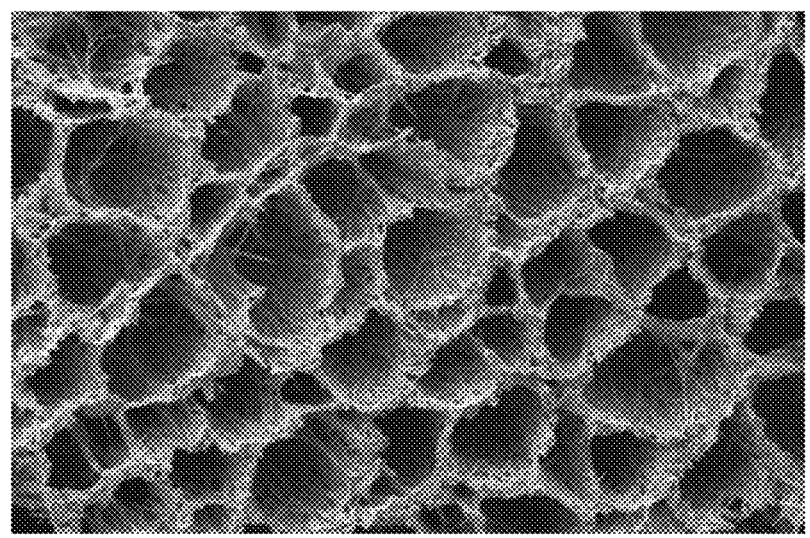

In at least one embodiment, galvanic deposition of honey-comb-shaped aluminum may be produced from the ionic liquid 1-butyl-1-methylpyrrolidinium-chloride ([BMPyrr][Cl]). In one or more embodiments, aluminum chloride is dissolved in a concentration of 60 mol. %, and a temperature of 52° C. is set. By way of at least one embodiment, deposition may be carried out at a potential of −0.5 V compared to the aluminum reference electrode. In one or more embodiments, after 45 minutes of deposition duration, the aluminum surface shown in FIG. 5 is obtained (image recorded by electron microscope).

(5) Dendritic Aluminum

Figure 6:
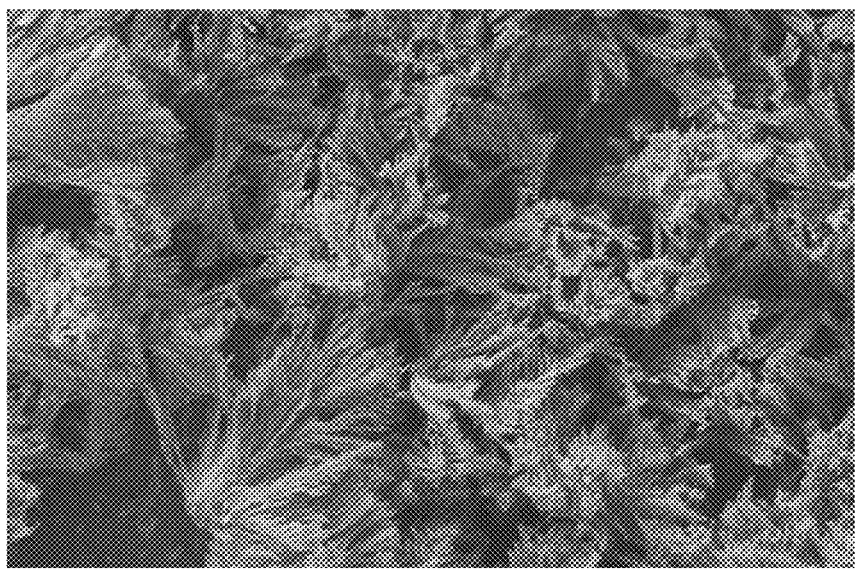

According to at least one embodiment, galvanic deposition of dendritic aluminum may be produced from the ionic liquid 1-butyl-1-methylpyrrolidinium-chloride ([BMPyrr][Cl]). In one or more embodiments, aluminum chloride is dissolved in a concentration of 60 mol. %, and a temperature of 28° C. is set. By way of at least one embodiment, deposition is carried out at a potential of −0.3 V compared to the aluminum reference electrode. In one or more embodiment, after 30 minutes of deposition duration, the aluminum surface as shown in FIG. 6 is obtained (image recorded by electron microscope).

Figure 7:
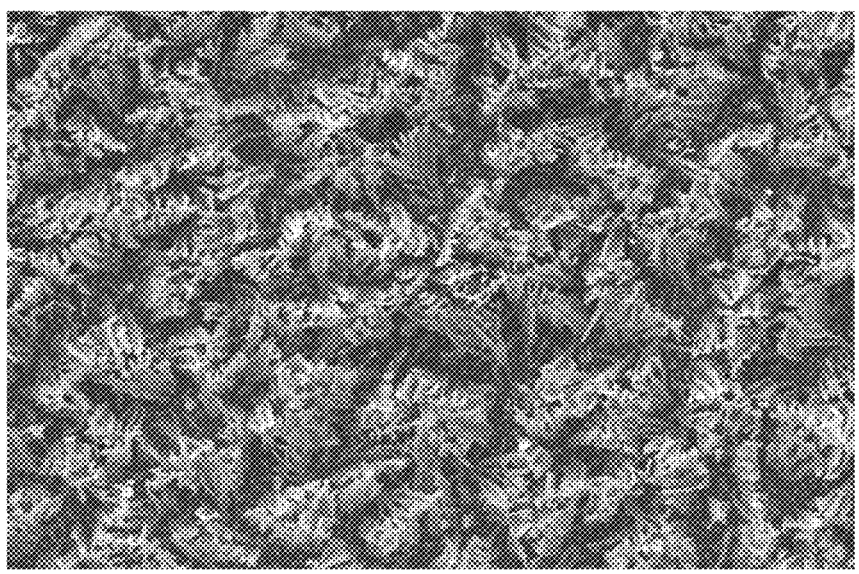

By way of one or more embodiments, the galvanic deposition of dendritic aluminum may be produced from an ionic liquid 1-butyl-1-methylpyrrolidinium-chloride ([BMPyrr][Cl]) diluted with toluene. In at least one embodiment, aluminum chloride is dissolved in a concentration of 60 mol. %, then a mass fraction of 5% toluene is added, and a temperature of 28° C. is set. In one or more embodiments, deposition may occur at a potential of −0.3 V compared to the aluminum reference electrode. In at least one embodiment, after 30 minutes of deposition duration, the aluminum surface as shown in FIG. 7 is obtained (image recorded by electron microscope), wherein the aluminum surface may include considerably more and smaller dendritic structures.

Production of an Aluminum Electrolytic Capacitor

In at least one embodiment, a foil made of aluminum is first cut. In one or more embodiments, the aluminum foil may then be coated galvanically on both sides, and coated, for example as described previously, with aluminum structures. Therefrom, at least one embodiment of the invention includes selective forming of the surface of the aluminum foil, using anodic oxidation, in order to generate the dielectric. In one or more embodiments, the obtained aluminum anode foil may be contacted, resulting in the assembly, to produce the capacitor. In at least one embodiment, the capacitor may include a roughened second aluminum foil such as a cathode foil, a paper as a separator, and a housing. According to at least one embodiment, the wound composite is received in an aluminum housing and may be impregnated with an electrolyte. By reforming, in one or more embodiments, any defective points in the dielectric are then remedied.

It will be apparent to those skilled in the art that numerous modifications and variations of the described examples and embodiments are possible in light of the above teaching. The disclosed examples and embodiments are presented for purposes of illustration only. Other alternate embodiments may include some or all of the features disclosed herein. Therefore, it is the intent to cover all such modifications and alternate embodiments as may come within the true scope of this invention.

What is claimed is:

1. A method for producing an anode electrode for an aluminum electrolytic capacitor, comprising:
   providing an aluminum electrolyte, wherein the aluminum electrolyte comprises an ionic liquid and an aluminum salt;
      wherein the ionic liquid comprises a pyrrolidinium cation and a halogenide anion, and,
      wherein the aluminum electrolyte further comprises 50-70 mol. % of the aluminum salt based on a total substance amount of the ionic liquid and the aluminum salt;
   deposing aluminum on a surface of an aluminum foil formed from the aluminum electrolyte using galvanic deposition, wherein the galvanic deposition comprises and is based on
      a deposition temperature in a temperature range of 20° C. to 100° C.;
      a current density in a density range of 1 to 100 mA/cm$^2$;
      an applied potential in a potential range of −0.1 V to −1.0 V based on a potential of an aluminum reference electrode; and
      a deposition rate in a rate range of 1 to 50 μm/h; and,
   oxidizing of the surface of the aluminum foil using anodic oxidation.

2. The method as claimed in claim 1, wherein the temperature range of the deposition temperature of the galvanic deposition comprises a range of 20° C. to 60° C.

3. The method as claimed in claim 2, wherein the potential range of the applied potential of the galvanic deposition comprises a range of −0.2 V to −0.6 V.

4. The method as claimed in claim 1, wherein the potential range of the applied potential of the galvanic deposition comprises a range of −0.2 V to −0.6 V.

5. The method as claimed in claim 1, wherein the ionic liquid comprises 1-butyl-1-methylpyrrolidinium-chloride ([BMPyrr][Cl]) or 1-butyl-1-methylpyrrolidinium-chloride ([BMPyrr][Cl]).

6. The method as claimed in claim 1, wherein the aluminum salt comprises aluminum fluoride, aluminum chloride, aluminum bromide, or aluminum iodide.

7. The method as claimed in claim 1, wherein the aluminum electrolyte further comprises an organic solvent.

8. The method as claimed in claim 7, wherein the aluminum electrolyte further comprises toluene.

9. The method as claimed in claim 1, wherein the ionic liquid consists essentially of a pyrrolidinium cation and a halogenide anion and an aluminum salt.

* * * * *